United States Patent
Somech et al.

(10) Patent No.: US 12,307,112 B2
(45) Date of Patent: May 20, 2025

(54) MEMORY CONTROLLER AND METHOD FOR DETECTING DATA SIMILARITY FOR DEDUPLICATION IN A DATA STORAGE SYSTEM

(71) Applicant: Huawei Technologies Co., Ltd., Shenzhen (CN)

(72) Inventors: Ovad Somech, Hod Hasharon (IL); Assaf Natanzon, Hod Hasharon (IL); Idan Zach, Hod Hasharon (IL); Aviv Kuvent, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/463,604

(22) Filed: Sep. 8, 2023

(65) Prior Publication Data
US 2023/0418497 A1    Dec. 28, 2023

Related U.S. Application Data

(63) Continuation of application No. PCT/EP2021/055895, filed on Mar. 9, 2021.

(51) Int. Cl.
*G06F 3/06* (2006.01)

(52) U.S. Cl.
CPC .......... *G06F 3/0641* (2013.01); *G06F 3/0604* (2013.01); *G06F 3/067* (2013.01); *G06F 3/0608* (2013.01); *G06F 3/0673* (2013.01)

(58) Field of Classification Search
CPC ...... G06F 3/0641; G06F 3/0604; G06F 3/067; G06F 16/1748; G06F 3/0608; G06F 3/0673
See application file for complete search history.

(56) References Cited

U.S. PATENT DOCUMENTS

| 8,290,972 | B1 * | 10/2012 | Deshmukh | G06F 16/24556 |
| | | | | 707/758 |
| 8,396,841 | B1 * | 3/2013 | Janakiraman | G06F 3/0608 |
| | | | | 707/802 |
| 8,572,163 | B1 * | 10/2013 | Bromley | G06F 16/1748 |
| | | | | 707/650 |

(Continued)

FOREIGN PATENT DOCUMENTS

WO    WO-2013157103 A1 * 10/2013    ......... G06F 3/0608

OTHER PUBLICATIONS

Matousek et al., "The probabilistic Method", Mar. 2008, pp. 1-71, https://www.cs.cmu.edu/~15850/handouts/matousek-vondrak-prob-In.pdf (Year: 2008).*

*Primary Examiner* — Christopher D Birkhimer
(74) *Attorney, Agent, or Firm* — Conley Rose, P.C.

(57) ABSTRACT

A memory controller is for receiving incoming data and storing and/or transmitting the incoming data utilizing deduplication. The memory controller determines a second hash corresponding to one or more first hashes. The second hash is a sparse hash and the first hashes are strong hashes. The memory controller populates a sparse index with the second hash. The sparse index associates the second hash with the corresponding first hashes. The memory controller determines the second hash based on a probability that the second hash corresponds to a plurality of first hashes using a probabilistic method.

20 Claims, 7 Drawing Sheets

(56) References Cited

U.S. PATENT DOCUMENTS

| | | | | |
|---|---|---|---|---|
| 8,732,403 | B1* | 5/2014 | Nayak | G06F 3/0619 |
| | | | | 711/170 |
| 9,715,434 | B1* | 7/2017 | Xu | G06F 3/067 |
| 9,733,836 | B1* | 8/2017 | Garg | G06F 3/0631 |
| 10,108,543 | B1* | 10/2018 | Duggal | G06F 11/14 |
| 10,108,544 | B1* | 10/2018 | Duggal | G06F 11/14 |
| 10,228,858 | B1* | 3/2019 | Stoakes | G06F 3/0641 |
| 10,282,371 | B1* | 5/2019 | Gaither | G06F 16/1748 |
| 10,346,076 | B1* | 7/2019 | Jonnala | G06F 3/067 |
| 10,528,731 | B1* | 1/2020 | Syme | G06F 21/565 |
| 10,631,036 | B1* | 4/2020 | Rabbat | H04N 21/44008 |
| 10,664,165 | B1* | 5/2020 | Faibish | G06F 3/0638 |
| 10,795,812 | B1* | 10/2020 | Duggal | G06F 3/067 |
| 10,846,301 | B1* | 11/2020 | Jia | G06F 17/18 |
| 2008/0144079 | A1* | 6/2008 | Pandey | H03M 7/30 |
| | | | | 358/1.15 |
| 2009/0041230 | A1* | 2/2009 | Williams | G06F 11/1448 |
| | | | | 707/999.204 |
| 2009/0089483 | A1* | 4/2009 | Tanaka | G06F 3/0608 |
| | | | | 711/E12.008 |
| 2009/0204650 | A1* | 8/2009 | Wong | G06F 16/1744 |
| 2010/0077013 | A1* | 3/2010 | Clements | G06F 16/1748 |
| | | | | 707/822 |
| 2010/0082672 | A1* | 4/2010 | Kottomtharayil | G06F 11/1451 |
| | | | | 711/E12.001 |
| 2010/0088296 | A1* | 4/2010 | Periyagaram | G06F 16/183 |
| | | | | 707/E17.014 |
| 2010/0125553 | A1* | 5/2010 | Huang | G06F 11/1453 |
| | | | | 707/661 |
| 2010/0174881 | A1* | 7/2010 | Anglin | G06F 11/1453 |
| | | | | 711/E12.103 |
| 2010/0281081 | A1* | 11/2010 | Stager | G06F 9/5022 |
| | | | | 707/814 |
| 2010/0333116 | A1* | 12/2010 | Prahlad | G06F 3/0649 |
| | | | | 713/153 |
| 2014/0114932 | A1* | 4/2014 | Mallaiah | G06F 3/0641 |
| | | | | 707/E17.032 |
| 2015/0205816 | A1* | 7/2015 | Periyagaram | G06F 11/1453 |
| | | | | 707/827 |
| 2015/0261776 | A1* | 9/2015 | Attarde | G06F 16/1748 |
| | | | | 707/664 |
| 2016/0246799 | A1* | 8/2016 | Constantinescu | G06F 16/1748 |
| 2016/0350324 | A1* | 12/2016 | Wang | G06F 16/137 |
| 2017/0010809 | A1* | 1/2017 | Hironaka | G06F 3/0689 |
| 2017/0038978 | A1* | 2/2017 | Li | G06F 3/0611 |
| 2017/0060769 | A1* | 3/2017 | Wires | G06F 12/1018 |
| 2017/0300691 | A1* | 10/2017 | Upchurch | G06F 21/12 |
| 2018/0138921 | A1* | 5/2018 | Arelakis | H03M 7/3071 |
| 2018/0314727 | A1* | 11/2018 | Epstein | G06N 5/01 |
| 2019/0236267 | A1* | 8/2019 | Sanders | H04L 9/0894 |
| 2020/0310686 | A1* | 10/2020 | Truong | G06F 3/061 |
| 2020/0349277 | A1* | 11/2020 | Torbey | G06F 21/6254 |
| 2021/0036714 | A1* | 2/2021 | Martin | G06F 13/1668 |
| 2021/0374021 | A1* | 12/2021 | Santhakumar | G06F 3/0659 |

* cited by examiner

DETERMINING A SECOND HASH, THE SECOND HASH BEING A SPARSE HASH AND CORRESPONDING TO ONE OR MORE FIRST HASHES, THE FIRST HASHES BEING STRONG HASHES
602

POPULATING A SPARSE INDEX WITH THE SECOND HASH, THE SPARSE INDEX ASSOCIATING THE SECOND HASH WITH THE CORRESPONDING FIRST HASHES
604

DETERMINING THE SECOND HASH BASED ON A PROBABILITY THAT THE SECOND HASH CORRESPONDS TO A PLURALITY OF FIRST HASHES USING A PROBABILISTIC METHOD
606

FIG. 6

MEMORY CONTROLLER AND METHOD FOR DETECTING DATA SIMILARITY FOR DEDUPLICATION IN A DATA STORAGE SYSTEM

CROSS-REFERENCE TO RELATED APPLICATIONS

This application is a continuation of International Patent Application No. PCT/EP2021/055895, filed on Mar. 9, 2021, which is hereby incorporated by reference in its entirety.

TECHNICAL FIELD

The disclosure relates generally to data pattern recognition, and more particularly, the disclosure relates to a memory controller and a method for the memory controller.

BACKGROUND

Deduplication is a method used to reduce an amount of data either passed over a network or stored in a data storage system, by identifying duplicates of the data at granularity level and avoiding passing or storing such duplicates explicitly. Deduplication is done by (i) dividing the data into segments, (ii) calculating fingerprints (i.e., strong hashes) per segment, and (iii) using the fingerprints to identify identical data (i.e., duplicate data). The main problem in the deduplication method is to efficiently locate existing fingerprints that have a high probability of being equal to incoming fingerprints since the amount of fingerprints is significant for large amounts of data where the deduplication is most relevant.

One known method to solve the above-mentioned problem is through a sparse index. The sparse index includes entries for documents that have the index field, even if the index field includes a null value. The method of using the sparse index includes (i) dividing the fingerprints into areas (i.e., association blocks), and (ii) selecting the representatives (i.e., weak hashes) from each area via a deterministic method. The representatives are derived from the selected fingerprints. For example, the two fingerprints (i.e., strong hashes) with the maximal value in that area are selected, and a subset of bits to be used from each of these fingerprints is picked as the representatives.

These representatives, with a pointer to the area they represent, are placed into the sparse index. When new fingerprints arrive (i.e., incoming fingerprints), the new representatives are selected from the new fingerprints in the same way as for the stored fingerprints. These new representatives are used for searching in the sparse index. Upon locating the same representatives in the sparse index, relevant fingerprint areas are uploaded and a one-by-one comparison of the incoming fingerprints with the existing fingerprints is performed. When equal fingerprints are identified, the duplicate data can be located.

The information in the sparse index needs to be consistent with the existing fingerprints. Otherwise, a deduplication ratio may degrade as the existing fingerprints may not be represented in the sparse index. Detecting similarity for the larger chunks enables the benefits of, on one side, small metadata footprint for keeping the higher layer of the index and, on the other side, an efficient access to metadata and data information once the data and metadata are grouped according to time and/or location reference. However, when working with small files and/or performing small, random overwrites, there are two issues: (1) how to group small files into relatively one large association block (maintaining small association blocks are not efficient); (2) how to find the representatives fingerprint (otherwise, the Sparse index needs to be accessed for each small random IO).

There are several basic approaches to maintain the metadata and increase the efficiency of access to low-performing media while looking for data duplications. One such known method involves using a prediction filter to predict a probability that such access shall result in a successful similarity detection. By doing so, performance desegregation as a result of unsuccessful attempts to search for metadata can be significantly reduced and performance can be significantly increased. A good example of such a prediction filter is a Bloom filter. However, the use of prediction filters, to increase the efficiency of access to low performing media, is challenging because such filters do not have means of efficient remove of referenced content which usually creates the need to zero the filter once in a period of time. Furthermore, using a prediction filter, on its own, only increases the probability for a successful single similarity lookup but it does provide the ability to anticipate expected data and metadata, to perform read ahead of both, and to efficiently utilize read and write caches.

Another known method involves using a layered layer of indexing in which metadata is gathered for larger chunks of data. Usually, the metadata is divided into blocks and from each block, several representatives are chosen deterministically and added to the index. One possible deterministic method for representative selection is to choose X minimal hashes in a block, and derive from them the sparse hashes which may be added to the index as representatives of this block. The use of similarity detection for big chunks of data, to increase the efficiency of access to low performing media, is challenging because in some systems and/or scenarios there is no possibility or no efficient possibility to gather enough data to perform the similarity detection of the first layer, which requires large chunks of data. For example, a storage system, which receives a slow rate of small IOs and is required to complete each IO in a given time limitation, may not be able to aggregate a larger enough data to perform large data chunk similarity and therefore shall not be able to access the layered index to detect similarities.

In the case of using a deterministic method to select X representatives per block, when receiving small IOs that prevent aggregation, the context is to be managed (i.e., able to determine when enough strong hashes representing a block is available), and search for its representatives in the index, or a search for representatives of much smaller blocks is to be performed—i.e., more searches. This may lead to more searches and more IOs as a result, more matches in the index may be located, but the blocks to which they point may not match the (much smaller) set of strong hashes from which the representatives are selected to search.

In certain cases, the referenced context might be so small that the added metadata cost becomes significant and affects the overall system performance. For example, when trying to detect similarity in files while using a single file as the similarity context, the ratio of metadata/data can significantly grow in small files and significantly reduce the data reduction ratios.

Therefore, there arises a need to address the aforementioned technical drawbacks and problems in detecting data similarity for deduplication in the data storage system.

SUMMARY

It is an object of the disclosure to provide a memory controller and a method for the memory controller to receive incoming data and to store and/or transmit the incoming data utilizing deduplication while avoiding one or more disadvantages of other approaches.

This object is achieved by the features of the independent claims. Further, implementation forms are apparent from the dependent claims, the description, and the figures.

The disclosure provides a memory controller and a method for the memory controller to receive incoming data and to store and/or transmit the incoming data utilizing deduplication.

According to a first aspect, there is provided a memory controller arranged to receive incoming data and to store and/or transmit the incoming data utilizing deduplication. The memory controller is configured to determine a second hash corresponding to one or more first hashes. The second hash is a sparse hash and corresponding to one or more first hashes. The first hashes are strong hashes. The memory controller is configured to populate a sparse index with the second hash. The sparse index associates the second hash with the corresponding first hashes. The memory controller is characterized in that the memory controller is further configured to determine the second hash based on a probability that the second hash corresponds to a plurality of first hashes using a probabilistic method.

The memory controller optimizes support for small files and/or small random IOs, by populating the sparse index in the probabilistic method, and uses the same probabilistic method to select which representatives to search in the sparse index, from incoming first hashes. The memory controller selects representatives from a small number of incoming first hashes based on the probabilistic method that allows having a high probability of selecting same representatives as those stored in the index, for similar sets of first hashes. This approach reduces the number of accesses to the sparse index because the sparse index is accessed only for representative first hashes. The memory controller handles multiple small files as a single virtual large file using a small set of second hashes. After locating a match, the memory controller uploads all of the block represented by the first hashes to memory. For small IOs in large files, or small IOs in small files grouped together deterministically, the uploaded block will, with high probability, include first hashes that may match future first hashes to be received. Thus, the memory controller seeds the cache with "read-ahead" first hashes data.

The probabilistic method may be a mathematical probabilistic method. Optionally, the memory controller is further configured to select a representative of the first hashes and to determine the second hash based on the representative. The memory controller may select the representative based on the representative having a specific bit pattern. The specific bit pattern may be a specific number of leading zeros. Optionally, the memory controller is further configured to select a plurality of representatives based on a single first hash.

Optionally, the memory controller is further configured to: (i) receive the incoming data and divide the incoming data into a number of data chunks, (ii) determine a first hash for each data chunk, providing one or more incoming first hashes, (iii) select at least one representative for the one or more incoming first hashes based on the probabilistic method. The number of data chunks may be below a chunk number threshold. The incoming data received may represent a number of system requests. The number of system requests may be below a first number threshold.

Optionally, the memory controller is further configured to read meta data for a first hash. The probability indicates a probability that the meta data corresponds to a plurality of first hashes in the incoming data. The memory controller may be a data storage arrangement.

According to a second aspect, there is provided a method for a memory controller arranged to be used to receive incoming data and to store and/or transmit the incoming data utilizing deduplication. The method includes determining a second hash corresponding to one or more first hashes. The second hash is a sparse hash and the first hashes are strong hashes. The method includes populating a sparse index with the second hash. The sparse index associates the second hash with the corresponding first hashes. The method includes determining the second hash based on a probability that the second hash corresponds to a plurality of first hashes using a probabilistic method.

The method optimizes support for small files and/or small random IOs, by populating the sparse index in the probabilistic method, and uses the same probabilistic method to select which representatives to search in the sparse index, from incoming first hashes. The representatives are selected from a small number of incoming first hashes based on the probabilistic method that allows having a high probability of selecting same representatives as those stored in the index, for similar sets of first hashes. This approach reduces the number of accesses to the sparse index, because the sparse index is accessed only for representative first hashes. The method is capable of handling multiple small files as a single virtual large file using a small set of second hashes. After locating a match, all of the block represented by the first hashes are uploaded to memory. For small IOs in large files, or small IOs in small files grouped together deterministically, the uploaded block will, with high probability, include first hashes that may match future first hashes to be received. Thus, providing an efficient method to seed the cache with "read-ahead" first hashes data.

According to a third aspect, there is provided a computer-readable medium carrying computer instructions that when loaded into and executed by a memory controller enables the memory controller to implement the above method.

A technical problem in other approaches is resolved, where the technical problem is that to detect data similarity for small files and random IOs dynamically by context aggregation for deduplication.

Therefore, in contradistinction to other approaches, according to the memory controller and the method receive incoming data and to store and/or transmit the incoming data utilizing deduplication, the efficiency of detecting data similarity for small files and random IOs is improved, and the memory controller avoids passing or storing duplicates that, otherwise, may take place due to locating more matches in the index by performing a greater number of searches. For example, the blocks to which the located matches point may not match the much smaller set of second hashes from which the representatives are selected for searching. The memory controller optimizes the support for small files and/or small random IOs, by populating the sparse index in the probabilistic method, and using the same method to select which representatives to search in the index, from incoming first hashes.

These and other aspects of the disclosure will be apparent from and the implementation(s) described below.

BRIEF DESCRIPTION OF DRAWINGS

Implementations of the disclosure will now be described, by way of example only, with reference to the accompanying drawings, in which:

FIG. 6 is a flow diagram that illustrates a method for a memory controller arranged to be used to receive incoming data and to store and/or transmit the incoming data utilizing deduplication in accordance with an implementation of the disclosure.

DESCRIPTION OF EMBODIMENTS

Implementations of the disclosure provide a memory controller and a method for the memory controller.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
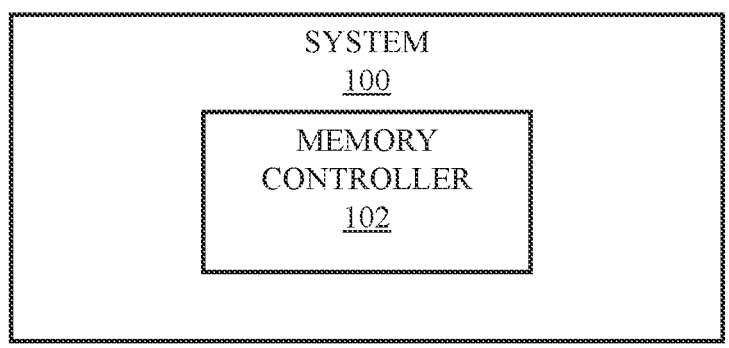
FIG. 1 is a block diagram of a system comprising a memory controller in accordance with an implementation of the disclosure.

FIG. 1 is a block diagram of a system 100 comprising a memory controller 102 in accordance with an implementation of the disclosure. The system 100 includes the memory controller 102. The memory controller 102 is arranged to receive incoming data and to store and/or transmit the incoming data utilizing deduplication. The memory controller 102 is configured to determine a second hash corresponding to one or more first hashes. The second hash is a sparse hash and the first hashes are strong hashes. The memory controller 102 is configured to populate a sparse index with the second hash. The sparse index associates the second hash with the corresponding first hashes. The memory controller 102 is configured to determine the second hash based on a probability that the second hash corresponds to one or more first hashes using a probabilistic method.

The memory controller 102 optimizes support for small files and/or small random IOs, by populating the sparse index in a probabilistic method, and uses the same probabilistic method to select which representatives to search in the sparse index, from incoming first hashes. The memory controller 102 selects representatives from a small number of incoming first hashes based on the probabilistic method that allows having a high probability of selecting same representatives as those stored in the index, for similar sets of first hashes. This approach reduces the number of accesses to the sparse index because the sparse index is accessed only for representative first hashes. The memory controller 102 handles multiple small files as a single virtual large file using a small set of second hashes. After locating a match, the memory controller 102 uploads all of the block represented by the first hashes to memory. For small IOs in large files, or small IOs in small files grouped together deterministically, the uploaded block will, with high probability, include first hashes that may match future first hashes to be received. Thus, the memory controller 102 seeds the cache with "read-ahead" first hashes data.

The probabilistic method may be a mathematical probabilistic method. Optionally, the memory controller 102 is further configured to select a representative of the first hashes and to determine the second hash based on the representative. The memory controller 102 may select the representative based on the representative having a specific bit pattern. The specific bit pattern may be a specific number of leading zeros.

For populating the sparse index, the representatives are selected from first hashes based on a condition that may provide with the high probability of the same number of representatives as in the deterministic method. As opposed to the existing approaches, the method does not need to gather multiple first hashes together to find min-hash or max-hash, but the representatives are selected by only using a single first hash at a time. The memory controller 102 computes the second hash from each first hash, and selects only those where the 6 least-significant bits are all 0. This gives a probability of selecting one first hash from 64 as representative leading to an average selecting two representatives from every 128 first hashes. The memory controller 102 computes a second hash for each incoming first hashes and checks if the second hash might be a representative, that is the memory controller 102 checks whether the 6 least significant bits are all 0 and the memory controller 102 accordingly searches for the second hash in the sparse index. Hence, the memory controller 102 does not need to store context of incoming first hashes to ensure two representatives from every 128 first hashes that represent a block and to query the sparse index for every incoming first hash. On average, the number of queries to the sparse index may be the same as for maintaining a context.

Optionally, the memory controller 102 is further configured to select a plurality of representatives based on a single first hash. Optionally, the memory controller 102 is further configured to (i) receive the incoming data and divide the incoming data into a number of data chunks, (ii) determine a first hash for each data chunk, providing one or more incoming first hashes, and (iii) select at least one representative for the one or more incoming first hashes based on the probabilistic method. The number of data chunks may be below a chunk number threshold. The incoming data received may represent a number of system requests. The number of system requests may be below a first number threshold.

Optionally, the memory controller 102 is further configured to read meta data for a first hash. The probability indicates a probability that the meta data corresponds to one or more first hashes in the incoming data. The memory controller 102 may be a data storage arrangement.

Figure 2:
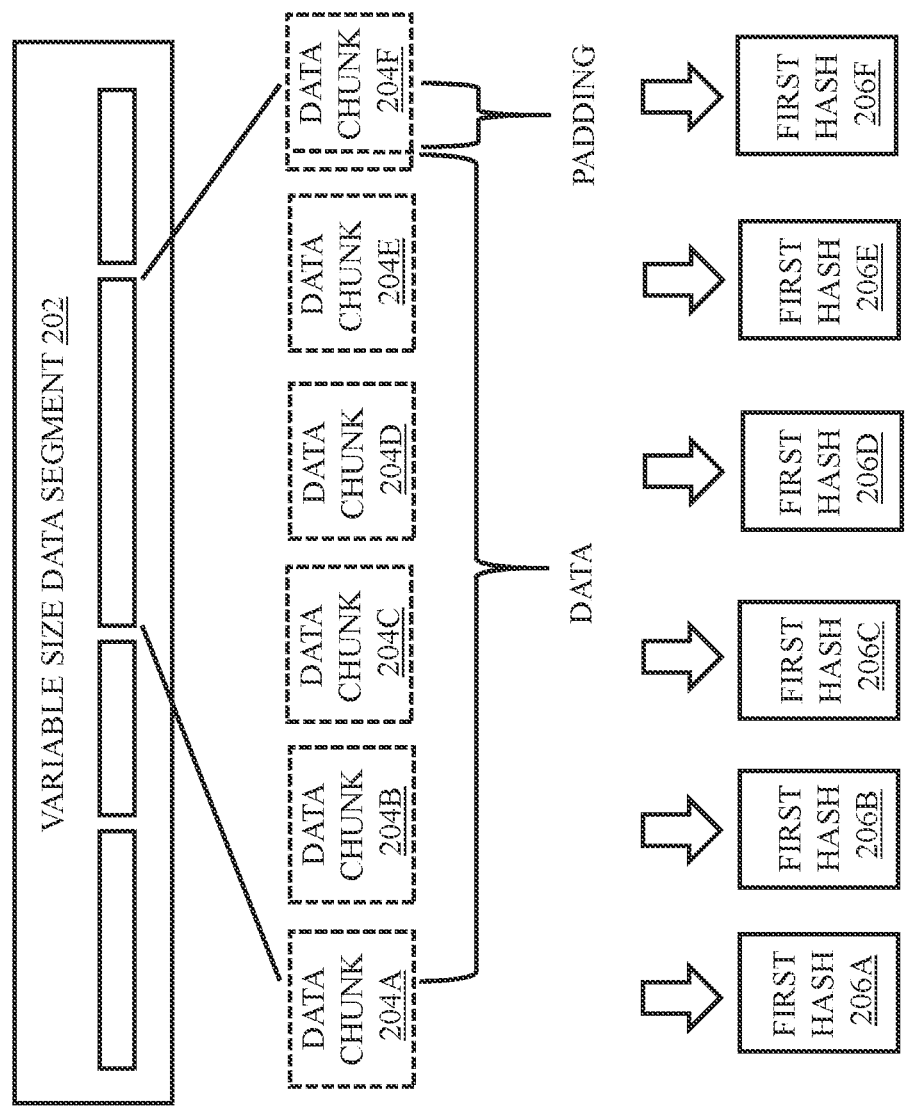
FIG. 2 is an exemplary diagram that illustrates data segmentation and calculation of first hashes by a memory controller in accordance with an implementation of the disclosure.

FIG. 2 is an exemplary diagram that illustrates data segmentation and calculation of first hashes by a memory controller in accordance with an implementation of the disclosure. The memory controller divides a variable size data segment 202 into data chunks 204A, 204B, 204C, 204D, 204E, and 204F. The memory controller may calculate first hashes 206A, 206B, 206C, 206D, 206E, and 206F corresponding to the data chunks 204A, 204B, 204C, 204D, 204E and 204F.

The memory controller receives the incoming data. The incoming data may be variable size data. The memory controller determines a first hash for each data chunk, providing one or more incoming first hashes. The number of data chunks may be below a chunk number threshold. The incoming data received may represent a number of system requests. The number of system requests may be below a first number threshold.

Figure 3:
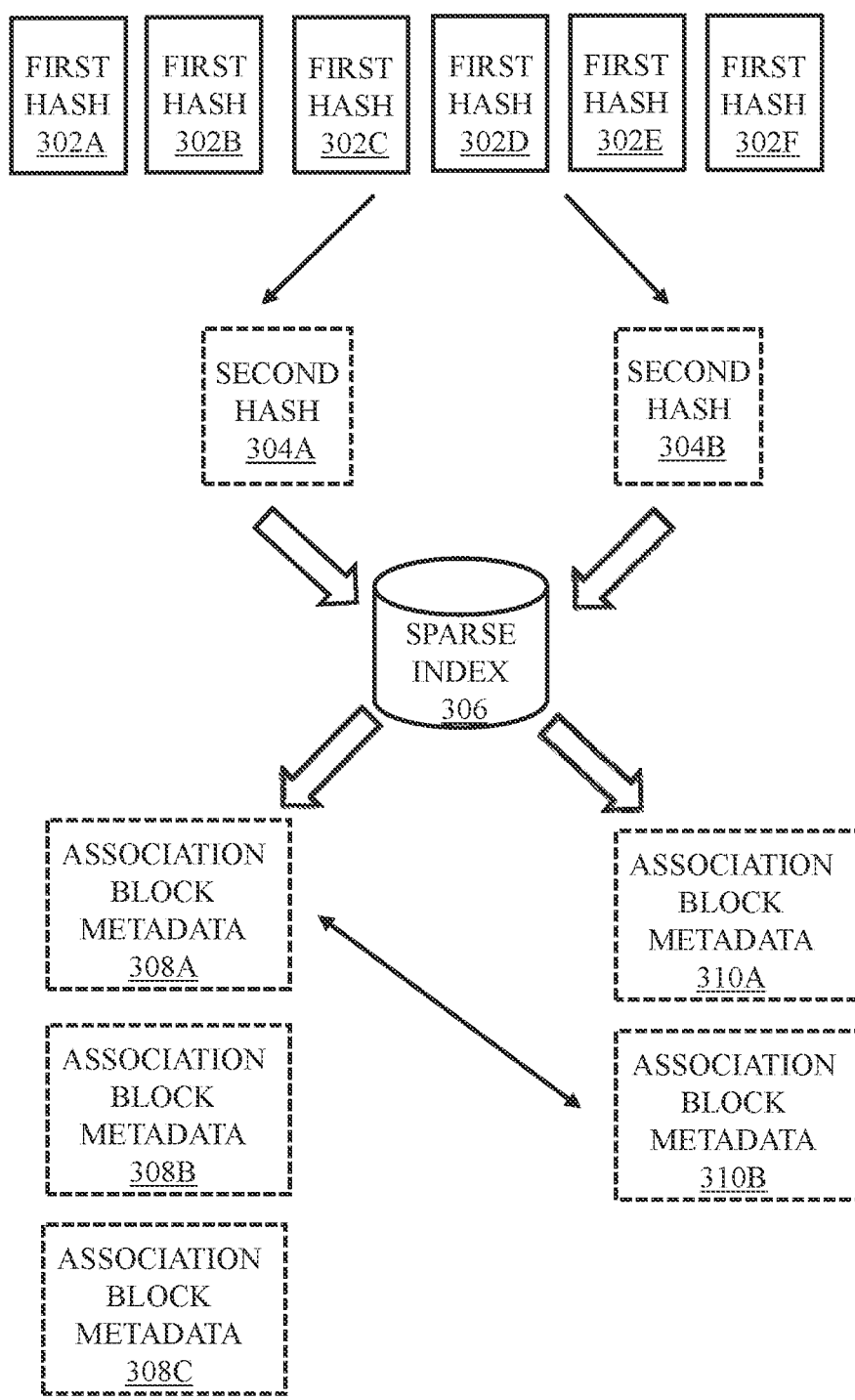
FIG. 3 is an exemplary diagram that illustrates populating a sparse index by a memory controller in accordance with an implementation of the disclosure.

FIG. 3 is an exemplary diagram that illustrates populating a sparse index by a memory controller in accordance with an implementation of the disclosure. The exemplary diagram depicts first hashes 302A, 302B, 302C, 302D, 302E, and 302F. The memory controller determines second hashes 304A, 304B corresponding to the one or more first hashes 302A, 302B, 302C, 302D, 302E, and 302F. The second hashes 304A, 304B are sparse hashes and the one or more first hashes 302A, 302B, 302C, 302D, 302E, and 302F are strong hashes. The memory controller populates a sparse index 306 with the second hashes 304A, 304B. The sparse index 306 associates the second hashes 304A, 304B with the corresponding first hashes 302A, 302B, 302C, 302D, 302E, and 302F. The memory controller determines the second hashes 304A, 304B based on a probability that the second hash corresponds to the one or more first hashes 302A, 302B, 302C, 302D, 302E, and 302F using a probabilistic method. The memory controller reads association block metadata 308A, 308B, 308C and 310A, 310B for the one or more first hashes 302A, 302B, 302C, 302D, 302E, and 302F and the probability indicates a probability that the meta data corresponds to one or more first hashes 302A, 302B, 302C, 302D, 302E, and 302F in the incoming data.

The probabilistic method may be a mathematical probabilistic method. Optionally, the memory controller is further configured to select a representative of the one or more first hashes 302A, 302B, 302C, 302D, 302E, and 302F and to determine the second hashes 304A, 304B based on the representative. The memory controller selects the representative based on the representative having a specific bit pattern. The specific bit pattern is a specific number of leading zeros.

The memory controller computes the second hashes 304A, 304B from each first hashes 302A, 302B, 302C, 302D, 302E, and 302F and selects only those where the 6 least-significant bits are all 0. This gives a probability of selecting one first hash from 64 as representative leading to an average selecting two representatives from every 128 first hashes. The memory controller computes a second hash for each incoming first hashes. The memory controller checks if the second hash for each incoming first hashes might be a representative, that is, the memory controller checks whether the 6 least significant bits are all 0 and the memory controller accordingly searches for the second hash in the sparse index. Hence, the memory controller does not need to store context of incoming first hashes to ensure two representatives from every 128 first hashes that represent a block and to query the sparse index for every incoming first hash. On an average, the number of queries to the sparse index may be the same as for maintaining a context. Optionally, the memory controller is further configured to select one or more representatives based on a single first hash.

Figure 4:
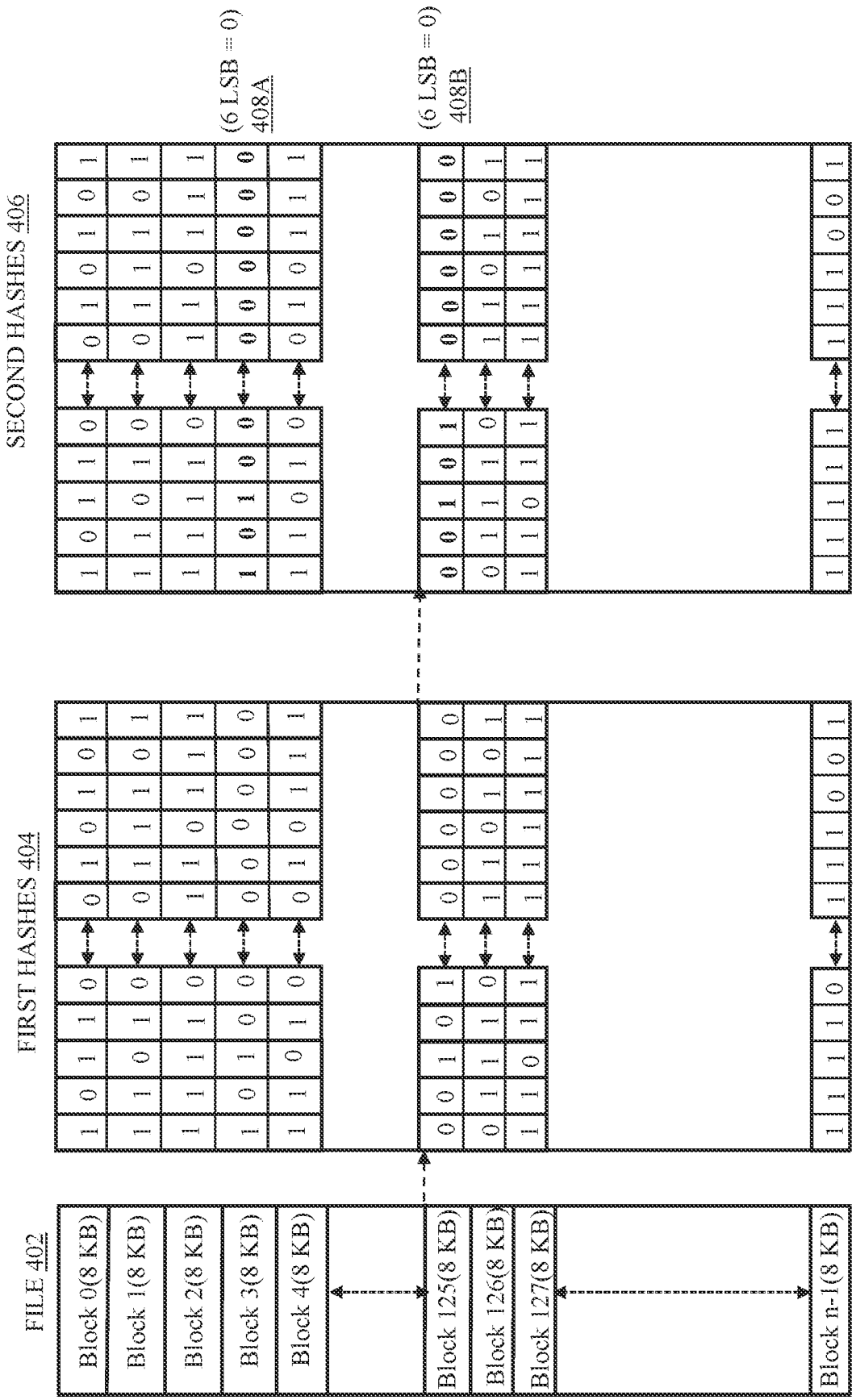
FIG. 4 is an exemplary diagram that illustrates selecting representative second hash from a large file by a memory controller in accordance with an implementation of the disclosure.

FIG. 4 is an exemplary diagram that illustrates selecting representative second hash from a large file 402 by a memory controller in accordance with an implementation of the disclosure. The exemplary diagram depicts the file 402 including block 0 to block n-1. Each block has a file size of 8 KB. One or more first hashes 404 include 160 bits per block and one or more second hashes 406 include 64 bits per block. The memory controller computes a second hash from each first hash 404 and selects only those where the 6 least-significant bits are all 0. This provides a probability of selecting a first hash from 64 as representative leading to an average selecting two representatives 408A, 408B from every 128 first hashes. When receiving incoming first hashes, the memory controller computes the second hash for each incoming first hashes. The second hash is checked for being the representative (i.e., whether the 6 least significant bits are all 0). If the second hash is the representative, the memory controller may perform a search for the second hash in the sparse index. The memory controller is further configured to read meta data for the first hash and the probability indicates a probability that the meta data corresponds to first hashes in the incoming data. Thus, if similarity is determined on reading the metadata for a block, continuation may probably be similar and hence reading further blocks is not needed. A context is maintained for the entire block thus avoiding the need to read blocks unnecessarily which would be many reads each taking time.

Figure 5:
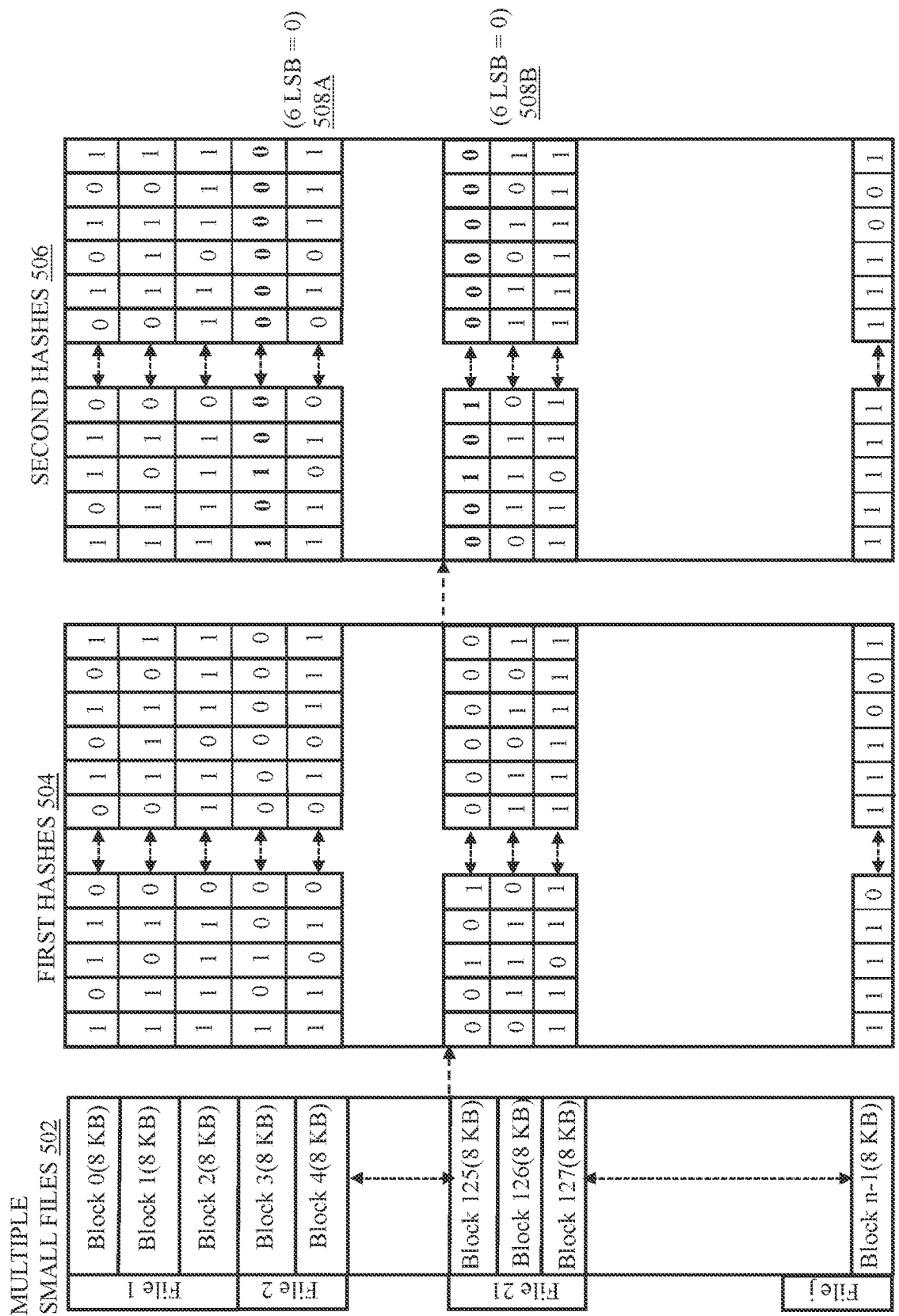
FIG. 5 is an exemplary diagram that illustrates selecting representative second hash from multiple small files by a memory controller in accordance with an implementation of the disclosure.

FIG. 5 is an exemplary diagram that illustrates selecting representative second hash from multiple small files 502 by a memory controller in accordance with an implementation of the disclosure. The exemplary diagram depicts the multiple small files 502 including block 0 to block n-1. Each block has a file size of 8 KB. At least two blocks constitute the file. One or more first hashes 504 include 160 bits per block and one or more second hashes 506 include 64 bits per block. The memory controller computes a second hash from each first hash 504 and selects only those where the 6 least-significant bits are all 0. This provides a probability of selecting one first hash from 64 as representative leading to an average selecting two representatives 508A, 508B from every 128 first hashes 504. When receiving incoming first hashes 504, the memory controller computes the second hash for each incoming first hashes 504. The memory controller checks the second hash for being the representative (i.e., whether the 6 least significant bits are all 0). If the second hash is the representative, the memory controller may perform a search for the second hash in the sparse index. The multiple small files can be handled as a single virtual large file using a small set of second hashes 506.

FIG. 6 is a flow diagram that illustrates a method for a memory controller arranged to be used to receive incoming data and to store and/or transmit the incoming data utilizing deduplication in accordance with an implementation of the disclosure. At a step 602, a second hash is determined. The second hash is a sparse hash corresponding to one or more first hashes and the first hashes are strong hashes. At a step 604, a sparse index is populated with the second hash. The sparse index associates the second hash with the corresponding first hashes. At a step 606, the second hash is determined based on a probability that the second hash corresponds to one or more first hashes using a probabilistic method.

The method optimizes support for small files and/or small random IOs, by populating the sparse index in the probabilistic method, and uses the same probabilistic method to select which representatives to search in the sparse index, from incoming first hashes. The representatives are selected from a small number of incoming first hashes based on the probabilistic method that allows having a high probability of selecting same representatives as those stored in the index, for similar sets of first hashes. This approach reduces the number of accesses to the sparse index because the sparse index is accessed only for representative first hashes. The method is capable of handling multiple small files as a single virtual large file using a small set of second hashes. After locating a match, all of the blocks represented by the first hashes are uploaded to memory. For small IOs in large files, or small IOs in small files grouped together deterministically, the uploaded block will, with high probability, include first hashes that may match future first hashes to be received, thus providing an efficient method to seed the cache with "read-ahead" first hashes data. The method is beneficial when the deduplication mechanism is integrated into the data path of a storage system, and the storage system provides the guarantee that strong hashes of small files are grouped together deterministically.

Figure 7:
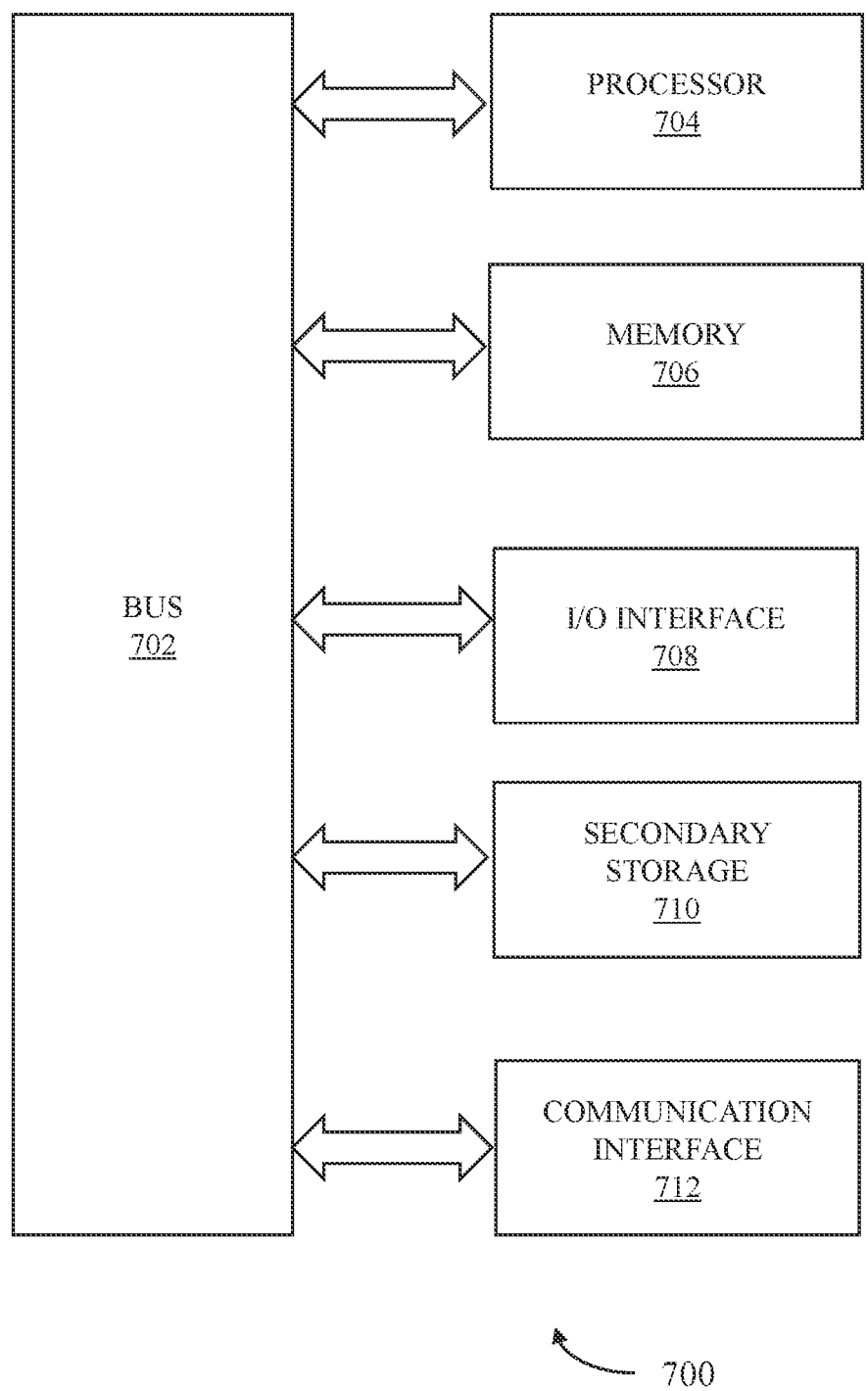
FIG. 7 is an illustration of a computer system (e.g., a memory controller, a data storage arrangement) in which the various architectures and functionalities of the various previous implementations may be implemented.

FIG. 7 is an illustration of a computer system (e.g., a memory controller, a data storage arrangement) in which the various architectures and functionalities of the various previous implementations may be implemented. As shown, the computer system 700 includes at least one processor 704 that is connected to a bus 702, wherein the computer system 700 may be implemented using any suitable protocol, such as Peripheral Component Interconnect (PCI), Peripheral Component Interconnect Express (PCIe), Accelerated Graphics Port (AGP), Hyper Transport, or any other bus or point-to-point communication protocol (s). The computer system 700 also includes a memory 706.

Control logic (software) and data are stored in the memory 706 which may take a form of random-access memory (RAM). In the disclosure, a single semiconductor platform may refer to a sole unitary semiconductor-based integrated circuit or chip. It should be noted that the term single semiconductor platform may also refer to multi-chip modules with increased connectivity which simulate on-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 700 may also include a secondary storage 710. The secondary storage 710 includes, for example, a hard disk drive and a removable storage drive, representing a floppy disk drive, a magnetic tape drive, a compact disk drive, digital versatile disk (DVD) drive, recording device, universal serial bus (USB) flash memory. The removable storage drive at least one of reads from and writes to a removable storage unit in a well-known manner.

Computer programs, or computer control logic algorithms, may be stored in at least one of the memory 706 and the secondary storage 710. Such computer programs, when executed, enable the computer system 700 to perform various functions as described in the foregoing. The memory 706, the secondary storage 710, and any other storage are possible examples of computer-readable media.

In an implementation, the architectures and functionalities depicted in the various previous figures may be implemented in the context of the processor 704, a graphics processor coupled to a communication interface 712, an integrated circuit (not shown) that is capable of at least a portion of the capabilities of both the processor 704 and a graphics processor, a chip set (namely, a group of integrated circuits designed to work and sold as a unit for performing related functions, and so forth).

Furthermore, the architectures and functionalities depicted in the various previous-described figures may be implemented in a context of a general computer system, a circuit board system, a game console system dedicated for entertainment purposes, an application-specific system. For example, the computer system 700 may take the form of a desktop computer, a laptop computer, a server, a workstation, a game console, an embedded system.

Furthermore, the computer system 700 may take the form of various other devices including, but not limited to a personal digital assistant (PDA) device, a mobile phone device, a smart phone, a television, and so forth. Additionally, although not shown, the computer system 700 may be coupled to a network (for example, a telecommunications network, a local area network (LAN), a wireless network, a wide area network (WAN) such as the Internet, a peer-to-peer network, a cable network, or the like) for communication purposes through an I/O interface 708.

It should be understood that the arrangement of components illustrated in the figures described are exemplary and that other arrangement may be possible. It should also be understood that the various system components (and means) defined by the claims, described below, and illustrated in the various block diagrams represent components in some systems configured according to the subject matter disclosed herein. For example, one or more of these system components (and means) may be realized, in whole or in part, by at least some of the components illustrated in the arrangements illustrated in the described figures.

In addition, while at least one of these components are implemented at least partially as an electronic hardware component, and therefore constitutes a machine, the other components may be implemented in software that when included in an execution environment constitutes a machine, hardware, or a combination of software and hardware.

Although the disclosure and its advantages have been described in detail, it should be understood that various changes, substitutions, and alterations can be made herein without departing from the spirit and scope of the disclosure as defined by the appended claims.

What is claimed is:

1. A system, comprising:
a memory configured to store instructions;
one or more processors coupled to the memory and configured to execute the instructions to cause the system to:
determine, using a probabilistic method, a second hash corresponding to one or more first hashes in a plurality of first hashes, wherein the second hash is a sparse hash, and wherein the first hashes are strong hashes; and
populate a sparse index with the second hash, wherein the sparse index associates the second hash with corresponding first hashes in the plurality of first hashes.

2. The system according to claim 1, wherein the probabilistic method is a mathematical probabilistic method.

3. The system according to claim 1, wherein the one or more processors are further configured to execute the instructions to cause the system to:
select a representative of the one or more first hashes; and
determine the second hash based on the representative.

4. The system according to claim 3, wherein the one or more processors are further configured to execute the instructions to cause the system to further select the representative based on the representative having a specific bit pattern.

5. The system according to claim 4, wherein the specific bit pattern is a specific number of leading zeros.

6. The system according to claim 3, further configured to select a plurality of representatives based on a single first hash.

7. The system according to claim 1, further configured to:
receive incoming data;
divide the incoming data into a number of data chunks;
determine a first hash for each data chunk to produce one or more incoming first hashes; and
select at least one representative from the one or more incoming first hashes based on the probabilistic method.

8. The system according to claim 7, wherein the number of data chunks is below a chunk number threshold.

9. The system according to claim 8, wherein the incoming data represents a number of system requests, and wherein the number of system requests is below a first number threshold.

10. The system according to claim 1, further configured to;
read metadata for a first hash; and
determine a probability that the metadata corresponds to the one or more first hashes.

11. The system according to claim 1, wherein the system is a data storage arrangement.

12. A method, comprising:
determining, using a probabilistic method, a second hash corresponding to one or more first hashes in a plurality of first hashes, wherein the second hash is a sparse hash, and wherein the first hashes are strong hashes; and
populating a sparse index with the second hash, wherein the sparse index associates the second hash with corresponding first hashes in the plurality of first hashes.

13. The method according to claim 12, further comprising:
selecting a representative of the one or more first hashes; and
determining the second hash based on the representative.

14. The method according to claim 13, further comprising selecting the representative based on the representative having a specific bit pattern.

15. The method according to claim 14, wherein the specific bit pattern is a specific number of leading zeros.

16. The method according to claim 13, further comprising selecting a plurality of representatives based on a single first hash.

17. The method according to claim 13, further comprising:
receiving incoming data;
dividing the incoming data into a number of data chunks;
determining a first hash for each data chunk to produce one or more incoming first hashes; and
selecting at least one representative from the one or more incoming first hashes based on the probabilistic method.

18. The method according to claim 17, wherein the number of data chunks is below a chunk number threshold.

19. A computer program product stored on a non-transitory computer storage medium that, when executed by one or more processors of an apparatus, causes the apparatus to:
determine, using a probabilistic method, a second hash corresponding to one or more first hashes in a plurality of first hashes, wherein the second hash is a sparse hash and corresponds to one or more first hashes in the plurality of first hashes, and wherein the one or more first hashes are strong hashes; and
populate a sparse index with the second hash, wherein the sparse index associates the second hash with corresponding first hashes in the plurality of first hashes.

20. The computer program product according to claim 19, wherein the computer program product, when executed by the one or more processors of the apparatus, further causes the apparatus to:
receive incoming data;
divide the incoming data into a number of data chunks;
determine a first hash for each data chunk to produce one or more incoming first hashes; and
select at least one representative from the one or more incoming first hashes based on the probabilistic method.

\* \* \* \* \*